United States Patent

Achenbach et al.

[11] Patent Number: 5,847,034
[45] Date of Patent: Dec. 8, 1998

[54] PORPHYRIN-CONTAINING SILICONES HAVING INCREASED THERMAL STABILITY

[76] Inventors: Frank Achenbach, Maria-Ward-Strasse 52, D-84359 Simbach; Wolfgang Hechtl, Robert-Koch-Strasse 53; Georg Eberl, Elisabeth-Strasse 21, both of D-84489 Burghausen; Norbert Egerter, Bachlehner-Strasse 1, D-84561 Mehring; Sabine Schreyer, Anton-Riemerschmid-Str. 43, D-84489 Burghausen, all of Germany

[21] Appl. No.: 636,422

[22] Filed: Apr. 23, 1996

[30] Foreign Application Priority Data

Jun. 14, 1995 [DE] Germany .................. 195 21 757.8

[51] Int. Cl.⁶ ...................................................... C08K 5/34
[52] U.S. Cl. ................................. 524/91; 524/88; 524/89
[58] Field of Search .................................. 524/89, 88, 91

[56] References Cited

U.S. PATENT DOCUMENTS

| 2,723,964 | 11/1955 | Warrick . | |
|---|---|---|---|
| 3,026,263 | 3/1962 | Arimoto . | |
| 4,330,637 | 5/1982 | Wong | 524/90 |
| 4,552,818 | 11/1985 | Wong . | |
| 5,155,149 | 10/1992 | Atwater et al. | 524/88 |

OTHER PUBLICATIONS

Intern. J. Polymeric Mater., 1994, vol. 25, pp. 13–28 "Metal Macrocyclic Complexes as Novel High Temperature Stabilizing Agents . . . " by Aseeva et al.

*Primary Examiner*—Melvyn I. Marquis

[57] ABSTRACT

The silicone compositions, in particular silicone oils and crosslinkable silicone compositions, contain porphyrins as heat stabilizer.

7 Claims, No Drawings

PORPHYRIN-CONTAINING SILICONES HAVING INCREASED THERMAL STABILITY

FIELD OF THE INVENTION

The present invention relates to porphyrin-containing silicones and to a silicone rubber having increased thermal stability, crosslinking silicone compositions, and the use of porphyrins as heat stabilizers in silicones.

BACKGROUND OF THE INVENTION

The stability of silicones, both uncrosslinked polyorganosiloxanes such as silicone oils and crosslinked silicone rubbers, under thermal or thermal oxidative stress is known to be increased by certain additives as heat stabilizers.

Known representatives of these heat stabilizers are the elements and compounds of the transition metals and lanthanides, especially the elements Ti, Mn, Fe, Co, Ni, Cu, Zn, Zr, Hf, Ce, Pd, Pt and their compounds. A further group is formed by organic compounds which are known as free-radical traps or metal ion deactivators, and also carbon black.

U.S. Pat. No. 3,026,263 describes, as heat stabilizers for silicone oils, combinations comprising an N-aryl-2-naphthylamine or an acridine having an at least tricyclic aromatic having a singlet-triplet excitation energy below 20,000 cm$^{-1}$, such as anthracene, benzanthracene, chrysene and pyrene. These heat stabilizers are physiologically harmful and not effective enough.

U.S. Pat. No. 2,723,964 describes the heat-stabilizing action of pentacyclic aromatics such as perylene, coronene and 2,3,8,9-dibenzocoronene, thioindigo dyes and phthalocyanines and their derivatives such as copper phthalocyanine, magnesium phthalocyanine and chlorinated copper phthalocyanine. The phthalocyanines are good heat stabilizers, but they are not readily soluble in the customary organic solvents and can not readily be distributed homogeneously in the silicone. As a result, the strength values of heat-stabilized silicone rubber are impaired.

It is an object of the present invention to provide effective heat stabilizers for silicones.

The present invention provides silicone compositions containing porphyrines as heat stabilizers.

Porphyrin-containing silicone oils and silicone elastomers have a higher thermooxidative stability than systems containing conventional heat stabilizers. This makes it possible to maintain the use properties of silicone compositions, in particular of silicone oils and silicone elastomers, for a longer time at higher temperatures.

Porphyrins enable, the thermooxidative stability of silicone elastomers to be increased even at contents of a few hundred ppm by weight.

The great variety within the class of porphyrin compounds makes possible a greater flexibility in respect of required final properties of the silicone compositions, such as thermal stability, color, transparency and toxicological requirements. As a result, it is possible to select heat stabilizers tailored to the respective application. Silicone oils and silicone elastomers containing porphyrins for the purpose of increasing their thermal stability are transparent and have a color corresponding to the porphyrins. The color can be fixed by appropriate selection of the porphyrins. The depth of color is determined by the porphyrin content.

The porphyrins can be dissolved in customary solvents, making a homogeneous distribution in the composition to be stabilized easier and resulting in no detrimental effect on the ultimate strength values of the stabilized silicone elastomers.

The heat stabilizer comprises 21H,23H-porphyrin and all the compounds derived from this basic framework, which are referred to as porphyrins. Substituents can be bound to the basic 21H,23H-porphyrin framework in 4 meso positions and 8 β-pyrrole positions. The porphyrins have conjugated ring system. The porphyrins preferably absorb electromagnetic radiation in the wavelength range between 400 and 800 nm.

Typical suitable porphyrins are represented by the formulae,

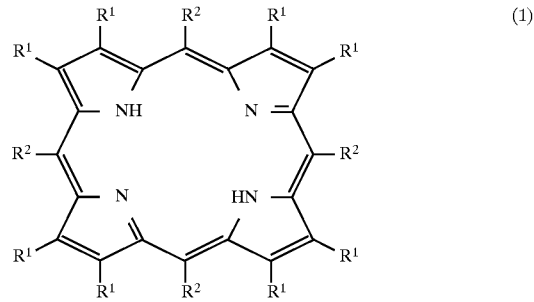

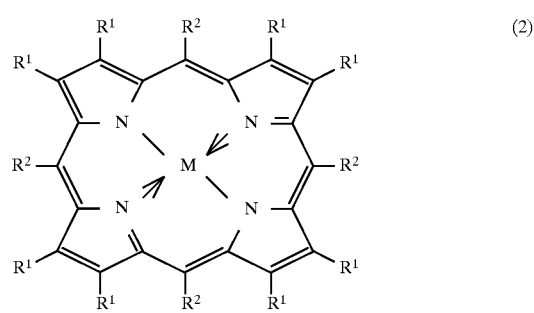

where $R^2$ is an identical or different radical selected from the group consisting of —H, —OH, —OR$^3$, —COR$^3$, —OCOR$^3$, —NO$_2$, —CN, —F, —Cl, —Br, —I, —SCN, —OCN, —N=N—OH, —NR$^3_2$ and —SO$_3$A, monovalent hydrocarbon radicals having from 1 to 20 carbon atoms which is optionally substituted by —H, —OH, OR$^3$, —COR$^3$, —COOR$^3$, —OCOR$^3$, —NO$_2$—CN, —F, —Cl, —Br, —I, —SCN, —OCN, —N=N—OH, NR$^3_2$, —NR$^3_3$B and —SO$_3$A, where, in the unsubstituted and substituted monovalent hydrocarbon radicals, non-adjacent units —CH= can be replaced by units —N= and units —CH$_2$— can be replaced by units —O—, —S— or —NH—, $R^3$ is selected from the group consisting of —H or monovalent hydrocarbon radicals having from 1 to 20 carbon atoms, A is selected from the group consisting of —H, Na, K, B is selected from the group consisting of Cl, F, Br, I, $R^1$ is an identical or different radical $R^2$ or two vicinal radicals $R^1$ together with the carbon atoms of the porphyrin ring to which they are bound are a cyclic hydrocarbon radical having from 5 to 10 carbon atoms in which non-adjacent units —CH= can be replaced by units —N= and units —CH$_2$— can be replaced by units —O—, —S— or —NH—, where, in the cyclic hydrocarbon radical, units —CH= and —CH$_2$— can be substituted with —H, —OH, —OR$^3$, —COR$^3$, —COOR$^3$, —OCOR$^3$, —NO$_2$, —CN, —F, —Cl, —Br, —I, —SCN, —OCN, —N=N—OH, —NR$^3_2$, —NR$^3_3$B and —SO$_3$A, and M is a metal selected from the group consisting of Li, Na, K, Rb and Cs, Be, Mg, Sr, Ba, V, Cr, Mn, Fe, Co, Ni, Cu, Zn, Zr, Ru, Hf, Os, Cd, Hg, Ag, Au, Pd, Pt, Si, Ge, Sn, In and Ce, where, if the oxidation state of M is higher than two, the free valences can be satisfied by radicals $R^2$ or radicals of organosilicon compounds.

In addition to the porphyrins represented by the formulae (1) and (2), it is also possible to use the partially hydrogenated derivatives of porphyrin provided the conjugation of the ring system is retained, for example 2,3-dihydroporphyrin 2,3,7,8-tetrahydroporphyrin, 5,10,15,20-tetramethyl-2,3-dihydroporphyrin, 5,10,15,20-tetraphenyl-2,3,7,8-tetrahydroporphyrin and their derivatives, particularly if they contain the above radicals $R^1$ and $R^2$. Multinuclear and bridged porphyrins can also be used.

Examples of radicals $R^2$ are alkyl groups such as methyl, ethyl, propyl, iso-propyl, butyl, iso-butyl, sec-butyl, tert-butyl, pentyl, hexyl, heptyl, 2-ethylhexyl, octyl, dodecyl, octadecyl, chloromethyl, 2-chloroethyl, 2-cyanoethyl, 2,2-dichloroethyl, 3,3,3-trifluoropropyl, 2,2,2,2',2',2'-hexafluoroisopropyl, heptafluoroisopropyl, perfluorohexyl-ethyl and beta-cyanoethyl, cycloalkyl groups such as cyclopentyl, cyclohexyl, cycloheptyl, methylcyclohexyl, cyclooctyl, 3,4-dichlorocyclohexyl and 2,6-dibromocycloheptyl, alkenyl and alkynyl groups such as vinyl, allyl, methallyl, 1-propenyl, 5-hexenyl, ethynyl, butadienyl, hexadienyl, cyclopentenyl, cyclopentadienyl and cyclohexenyl, aryl groups such as phenyl, tolyl, xylyl, mesityl, benzyl, beta-phenylethyl, phenyl-propyl, naphthyl, o-, m- and p-chlorophenyl, 3-sulfophenyl, 4-nitrophenyl, dichlorophenyl, trichloro-phenyl, pentachlorophenyl, difluorophenyl, pentafluorophenyl, trifluoromethylphenyl, 4-pyridyl, 1-methyl-4-pyridinio, 4-trimethylammoniophenyl and bromo-tolyl, alkoxy groups such as methoxy, ethoxy, propoxy, butoxy, tert-butoxy, 4-methoxyphenyl, chloromethoxy, dichloroethoxy and dichloropentoxy, an alcoholic group such as hydroxymethyl, 1-hydroxyethyl, 3-hydroxypropyl, 3-hydroxypropenyl, an aldehydic radical such as formyl and 3-oxopropenyl, other oxygen-containing radicals such as acetyl, acetoxy, propanoyloxy, benzoyl, benzoyloxy, hexanoyloxy and hexadecanoyl. Preferred radicals $R_2$ are —H, alkyl and aryl groups. More preferred radicals $R_2$ are —H and phenyl.

Examples of porphyrins in which two vicinal radicals $R^1$ together with the carbon atoms of the porphyrin ring to which they are bound form a cyclic hydrocarbon radical having from 5 to 10 carbon atoms are benzoporphyrins and naphthoporphyrins.

The hydrocarbon radicals $R^1$, $R^2$ and $R^3$ have, from 1 to 10 carbon atoms. The radicals $R^1$, $R^2$ and $R^3$ are hydrogen atoms, alkyl and aryl radicals, in particular unsubstituted radicals.

As M, preference is given to Li, Na, K, Rb and Cs, Mg, Ba, V, Cr, Mn, Fe, Co, Ni, Cu, Zn and Si.

The radicals of organosilicon compounds on M can be bound, via oxygen or a divalent hydrocarbon radical having from 1 to 20 carbon atoms, in particular a divalent alkyl radical having from 1 to 10 carbon atoms. Examples of such radicals of organosilicon compounds are trimethylsilyl, trimethylsilylmethylene trimethylsilyloxy and trimethylsilyloxybutyl.

As silicone compositions containing porphyrins as heat stabilizer, preference is given to silicone oils. The silicone oil is preferably a polyorganosiloxane (I) having a viscosity at 25° C. of at least 10 mpa.s, in particular 100 mPa.s and at most $10^9$ mPa.s, preferably $10^6$ mPa.s, in particular 50,000 mpa.s.

The polyorganosiloxane (I) is made up of units of the formula

  (3), where $R^4$ is identical or different, monovalent hydrocarbon radicals having from 1 to 18 carbon atoms which are optionally fluoro-, chloro-, bromo- or cyano-substituted and a is 0, 1, 2 or 3.

Examples of monovalent hydrocarbon radicals $R^4$ are aliphatically saturated or unsaturated alkyl groups such as methyl, ethyl, propyl, iso-propyl, butyl, iso-butyl, sec-butyl, tert-butyl, pentyl, hexyl, heptyl, 2-ethylhexyl, octyl, dodecyl, octadecyl, chloromethyl, 2,2-dichloroethyl, 3, 3,3-trifluoropropyl, 2,2,2,2'2'2'-hexafluoroisopropyl, heptafluoroisopropyl, perfluoro-hexylethyl and beta-cyanoethyl, cycloalkyl groups such as cyclopentyl, cyclohexyl, cycloheptyl, methylcyclohexyl, cyclooctyl, 3,4-dichlorocyclohexyl and 2,6-dibromocycloheptyl, alkenyl and alkynyl groups such as vinyl, allyl, methallyl, 1-propenyl, 5-hexenyl, ethynyl, butadienyl, hexadienyl, cyclopentenyl, cyclopentadienyl and cyclohexenyl, aryl groups such as phenyl, tolyl, xylyl, mesityl, benzyl, beta-phenylethyl, phenylpropyl, naphthyl, o-, m- and p-chlorophenyl, dichlorophenyl, trichlorophenyl, difluorophenyl, trifluoromethylphenyl and bromotolyl.

The hydrocarbon radicals $R^4$ have from 1 to 7 carbon atoms. Preference is given to unsubstituted alkyl and aryl groups. More preference is given to methyl and phenyl.

Si-bonded H—, HO— and alkoxy groups such as methoxy, ethoxy and propoxy can also be present to a lesser extent. The polyorganosiloxane (I) can be linear, cyclic, branched or network-like. Branched polyorganosiloxanes contain not only monofunctional units such as $R^4_3SiO_{1/2}$, and difunctional units such as $R^4_2SiO_{2/2}$ but also trifunctional units such as $R^4SiO_{3/2}$ and/or tetrafunctional units $SiO_{4/2}$. The use of linear and branched polyorganosiloxanes (I) is preferred. More preference is given to linear polyorganosiloxanes (I).

The polyorganosiloxanes (I) can also contain units of the formula

 (4), where $R^5$ is identical or different, divalent hydrocarbon radicals having from 1 to 18 carbon atoms which are optionally fluoro-, chloro-, bromo- or cyano-substituted, or polyoxy-$C_1$–$C_4$-alkylene radicals and $R^4$ is as defined in formula (3).

Examples of divalent hydrocarbon radicals $R^5$ are divalent unsubstituted hydrocarbon radicals such as ethylene, propylene, phenylene and biphenylene. Examples of polyoxy-$C_1$–$C_4$-alkylene radicals are polyoxyethylene and polyoxymethylene. Divalent radicals $R^5$ can be present in the silicone oil to an extent of up to 50 mole %.

The silicone oil can also be a mixture of the above described polyorganosiloxanes (I). Preferred silicone oils are polymeric dimethylsiloxanes, diphenylsiloxanes and methylphenylsiloxanes and also copolymeric dimethylmethylphenylsiloxanes and dimethylmethylvinylsiloxanes, having trimethylsiloxy, dimethylvinylsiloxy or hydroxyl end groups.

Preferred silicone compositions are crosslinkable silicone rubber compositions containing porphyrins as heat stabilizer and the silicone rubber compositions obtainable therefrom by crosslinking.

The type of crosslinking of the silicone rubber compositions is not critical to the effectiveness of these heat stabilizers. For example, addition-, peroxidically-, condensation-, dehydrocondensation- and radiation-crosslinked silicone rubber compositions can contain porphyrins as heat-stabilizing additive.

The crosslinkable silicone rubber compositions comprise, apart from porphyrins, the constituents (I) a polyorganosiloxane (I), (II) crosslinking-specific additives, (III) optionally a filler, and (IV) optionally further additives.

Constituent (I) corresponds to the above described polyorganosiloxane (I).

The viscosity at 25° C. of the polyorganosiloxane (I) used for crosslinkable silicone rubber compositions is at least 1 mpa.s, in particular 100 mpa.s, and at most $10^9$ mpa.s, preferably $10^8$ mpa.s, in particular $10^7$ mPa.s.

Polyorganosiloxanes (I) of addition-crosslinking compositions contain at least two aliphatically unsaturated groups $R^4$ which undergo a hydrosilylation reaction with an SiH-functional crosslinker. Such groups include the above described aliphatically unsaturated alkenyl, cycloalkenyl and alkynyl groups. However, polyorganosiloxanes (I) of addition-crosslinking compositions can contain alkenyloxyalkyl groups such as allyloxypropyl as aliphatically unsaturated groups. The alkenyl groups can be located in any position on the polymer chain, in particular on the terminal silicon atoms.

Preference is given to using vinyl-containing polydimethylsiloxanes whose molecules correspond to the formula

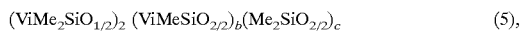

$(ViMe_2SiO_{1/2})_2 (ViMeSiO_{2/2})_b(Me_2SiO_{2/2})_c$ (5), where Vi are vinyl groups and Me are methyl groups, b and c are non-negative numbers and fulfil the following relationships: b+1>0, 50<(b+c)<10000, preferably 200<(b+-c) <5000 and 0<(b+1)/(b+c)<0.2.

The SiH-functional polyorganosiloxane (I) functioning as crosslinker in addition-crosslinking silicone rubber compositions is made up of units of the formula

$H_d R^4_e SiO_{(4-d-e)/2}$ (6)

where $R_4$ is as defined above, d is 0, 1 or 2, e is 0, 1, 2 or 3, with the proviso that the sum (d+e)<4 and at least two silicon-bonded hydrogen atoms are present per molecule.

Preference is given to using a polyorganosiloxane (I) containing three or more SiH bonds per molecule. When using a polyorganosiloxane (I) containing only two SiH bonds per molecule, the polyorganosiloxane (I) containing aliphatically unsaturated groups preferably contains at least three alkenyl groups per molecule.

The hydrogen content of the SiH-functional polyorganosiloxane (I), based purely on the hydrogen atoms bound directly to silicon atoms, is at least 0.002% by weight, in particular 0.1% by weight, of hydrogen and preferably at most 2.5% by weight, in particular 1.5% by weight, of hydrogen.

The SiH-functional polyorganosiloxane (I) contains at least three and preferably at most 600 silicon atoms per molecule. Preference is given to the use of SiH-functional polyorganosiloxanes (I) as crosslinkers containing between 4 and 200 silicon atoms per molecule.

Polyorganosiloxane (I) containing aliphatically unsaturated groups and SiH-functional polyorganosiloxane (I) are present in separate components, for example as a two-component system, so that the crosslinking reaction can proceed only after mixing the components.

Polyorganosiloxanes (I) of peroxidically crosslinked silicone rubber compositions generally require no specific organic radicals. Preference is given to using polydimethylsiloxanes containing SiOH, trimethylsiloxy or dimethylvinylsiloxy end groups and, optionally, from 0.05 to 0.5% by weight, preferably from 0.1 to 0.2% by weight, of vinyl groups in the form of $ViMe_2SiO_{1/2}$ and/or $ViMeSiO_{2/2}$ units.

The viscosity at 25° C. of the polyorganosiloxanes (I) used for condensation-crosslinking silicone rubber compositions is at least 100 mpa.s, in particular at least 1000 mPa.s, and preferably at most $10^9$mPa.s, in particular at most $10^8$ mpa.s.

Polyorganosiloxanes (I) of condensation-crosslinking silicone rubber compositions containing silanol groups or groups which react under hydrolytic conditions to form silanol groups. $R^4$ can also be a hydroxyl, acetoxy, alkoxy, amino, amido, aminoxy, isopropenoxy and oximato group. The viscosity at 25° C. of the polyorganosiloxanes (I) used for condensation-crosslinking silicone rubber compositions is at least 20 mPa.s, in particular at least 100 mpa.s, and preferably at most $10^9$ mPa.s, in particular at most 10,000 mpa.s.

Condensation-crosslinking silicone rubber compositions can be single- and two-component systems (RTV-1 and RTV-2). Condensation-crosslinking RTV-1 systems are preferably prepared by reacting an SiOH-terminated polydiorganosiloxane with one or more silanes containing at least two hydrolysable groups such as acetoxy, alkoxy, amino, amido, aminoxy, isopropenoxy or oximato, in the presence of a condensation catalyst, under anhydrous conditions. It is also possible to use partial-hydrolysates of the above described silanes containing hydrolysable groups. Such RTV-1 systems crosslink from the surface under the action of atmospheric moisture. A silane having at least three hydrolysable groups or its partial-hydrolysate functions as crosslinker. The crosslinker can also be present separately from the polyorganosiloxane to be crosslinked (RTV-2 system).

Constituent (I) can be any mixture of different above described polyorganosiloxanes (I). Constituent (I) can be distributed over a plurality of components.

In the case of an addition-crosslinking silicone rubber composition, constituent (II) is a hydrosilylation catalyst. Hydrosilylation catalysts which can be used are in principle all catalysts customarily used in addition-crosslinking silicone rubber compositions. These include transition metals such as platinum, rhodium, palladium, ruthenium and iridium, preferably platinum, which are, fixed on finely divided support materials such as activated carbon, metal oxides such as aluminum oxide or pyrogenic silicon dioxide.

Preference is given to using platinum and platinum compounds. Particular preference is given to those platinum compounds which are soluble in polyorganosiloxanes. Examples of soluble platinum compounds which can be used are the platinum-olefin complexes of the formulae $(PtCl_2.olefin)_2$ and $H(PtCl_3.olefin)$, where alkanes having from 2 to 8 carbon atoms, for example ethylene, propylene, isomers of butene and octene, or cycloalkenes having from 5 to 7 carbon atoms, for example cyclopentene, cyclohexene and cycloheptene, are preferably used. Further soluble platinum catalysts are the platinum-cyclopropane complex of the formula $(PtCl_2.C_3H_6)_2$, the reaction products of hexachloroplatinic acid with alcohols, ethers and aldehydes or mixtures of the same or the reaction product of hexachloroplatinic acid with methyl-vinylcyclotetrasiloxane in the presence of sodium bicarbonate in ethanolic solution. Particular preference is given to complexes of platinum with vinylsiloxanes such as sym-divinyltetramethyldisiloxane.

When using customary platinum catalysts, the platinum content of the curable silicone rubber composition is, based on platinum metal, in the range from 0.1 to 500 ppm by weight, preferably from 10 to 100 ppm by weight.

A typical constituent of addition-crosslinking silicone rubber compositions comprises inhibitors which serve to set the processing time and the vulcanization characteristics in a targeted way. These inhibitors and stabilizers are, acetylenic alcohols such as ethynylcyclohexanol and 2-methyl-3-butyn-2-ol, polymethylvinylcyclosiloxanes such as methylvinylcyclotetrasiloxane, low molecular weight siloxanes having vinyldimethylsiloxy end groups, trialkyl cyanurates, alkyl maleates such as diallyl maleate and dimethyl maleate, alkyl fumarates such as diethyl fumarate and diallylfumarate, organic hydroperoxides such as cumene hydroperoxide, tert-butyl hydroperoxide and pinane hydroperoxide, organic peroxides, benzotriazole, organic sulfoxides, organic amines and amides, phosphines, phosphites, nitriles, diaziridines and oximes. Preferred inhibitors are acetylenic alcohols.

Constituent (II) of a peroxidically crosslinking silicone rubber composition is an organic peroxide compound. Preference is given to using peroxides such as dibenzoyl peroxide, bis(2,4-dichlorobenzoyl) peroxide, dicumyl peroxide, 2,5-bis(tert-butylperoxy)-2,5-dimethyl-hexane, 1,4-bis(tert-butylperoxyisopropoxy)benzene and mixtures thereof. Preference is given to dicumyl peroxide and bis(2,4-dichlorobenzoyl)peroxide. The peroxide content of the crosslinkable polyorganosiloxane composition is at least 0.1% by weight, in particular 0.7% by weight, and at most 4.0% by weight, in particular 1.5% by weight.

The constituent (II) present in a condensation-crosslinking silicone rubber composition can be a condensation catalyst. Suitable condensation catalysts are in principle all acids, bases and salts of the metals tin, titanium, zirconium, lead, cobalt, zinc, copper, manganese, iron, and also quaternary ammonium salts of organic acids, alcohols or chelating agents. Preference is given to using compounds of tin, titanium, and zirconium. Particular preference is given to dialkyltin dicarboxylates such as dibutyltin dilaurate and dibutyltin diacetate.

The crosslinkable silicone rubber composition can contain a filler as constituent (III). A distinction is made between actively reinforcing fillers and non-reinforcing fillers. Actively reinforcing fillers have a BET specific surface area of at least 50 m$^2$/g, preferably from 50 to 500 m$^2$/g. Examples of actively reinforcing fillers are pyrogenic silica, silicic acid hydrogels dehydrated without changing their structure, aerogels, and other types of precipitated silicon dioxide, furnace black and acetylene black.

The non-reinforcing fillers, i.e. fillers having a BET specific surface area of less than 50 m$^2$/g, include quartz flour, diatomaceous earth, calcium silicate, zirconium silicate, zeolites, iron oxide, zinc oxide, titanium dioxide, aluminum oxide, calcium carbonate, magnesium carbonate, zinc carbonate, carbon black, graphite, mica and chalk.

Said fillers can be made hydrophobic by treatment with a hydrophobizing agent. Hydrophobizing agents are alkylchlorosilanes such as methyltrichlorosilane, dimethyldichlorosilane and octadecylmethyldichlorosilane alkylalkoxysilanes such as dimethyldimethoxysilane, trimethylethoxysilane and dimethyldiethoxysilane; trimethylsilanol; disilazanes such as hexamethyldisilazane, divinyltetramethyldisilazane and cyclohexamethyltrisilazane; low molecular weight cyclosiloxanes such as octamethylcyclotetrasiloxane and short-chain SiOH-terminated polydimethylsiloxanes having a chain length in the range from 2 to 20 siloxane units.

The amount of said fillers present in the crosslinkable silicone rubber compositions can be from 0% to 80% by weight, preferably between 0% and 50% by weight.

The crosslinkable silicone rubber composition can additionally contain from 0% to 80% by weight, preferably between 0% and 30% by weight, of further additives (IV). These include, dispersants, dyes, pigments, cocatalysts, coupling agents, antioxidants, metal deactivators, metal dusts, glass and ceramic fibers, solvents, water, protective agents, biocides, polymer powders, plasticizers, silicone resins, softeners, emulsifiers and stabilizers.

In particular, the further additives (IV) include other heat stabilizers. Since heat stabilizers have different mechanisms of action and synergistic effects in the combination of various heat stabilizers can sometimes be achieved, the crosslinkable silicone rubber composition can contain not only the porphyrins but also customary heat stabilizers.

The silicone oils can contain not only the porphyrins but also customary heat stabilizers.

The porphyrin functioning as heat stabilizer can be mixed into the silicone composition to be stabilized either directly in finely divided form or fixed on a finely divided support material such as pyrogenic silica or by means of a suitable solvent which can, subsequently be removed. The porphyrin can also be introduced in the form of an essentially homogeneous mixture with a material compatible with the silicone composition to be stabilized, for example a silicone oil. The porphyrin functioning as a heat stabilizer can also be introduced by being synthesized in the silicone composition to be stabilized, by reacting the starting materials in the latter. Preference is given to the preparation of homogeneous heat stabilizers containing the porphyrin in a high concentration and allowing simple mixing in/metering in as additive. A plurality of different porphyrins can also be used simultaneously. Increasingly fine dispersion of the porphyrins in the medium to be stabilized gives an increase in the heat-stabilizing action. The preparation of the porphyrin compounds functioning as heat stabilizer is known per se.

The porphyrin content of the thermally stabilized silicone composition is at least 5 ppm by weight, preferably 100 ppm by weight and in particular 500 ppm by weight, and at most 100,000 ppm by weight, more preferably 5000 ppm by weight, in particular 1000 ppm by weight.

The thermally stabilized silicone composition is produced by mixing the silicone oil or the crosslinkable silicone rubber composition and the porphyrin with one another in an appropriate manner. Depending on the type of crosslinking, a wide variety of procedures are known in the production of the crosslinkable silicone rubber composition. Frequently, individual constituents are combined into components which are mixed with one another only for the purpose of crosslinking. It is immaterial into which of the components the porphyrin is incorporated. The incorporation of the porphyrin can be carried out at room temperature or at elevated temperature, with or without solvents.

The crosslinkable silicone rubber compositions can be crosslinked to form silicone elastomers in accordance with the known processes, by addition-, peroxide-, condensation-, dehydrocondensation- or radiation-crosslinking.

The thermally stabilized silicone oils are suitable as heat transfer media in thermostats, as thermally stable lubricants and, in particular, as fluid for viscous couplings.

The thermally stabilized crosslinkable silicone rubber compositions are suitable for producing high-temperature resistant silicone rubber articles such as seals, sealing materials, electrical insulation materials for the electrical industry and for automobile construction, heat-stressed conveyor belts, coverings on rollers, hoses and films.

EXAMPLES

In the following examples, all viscosities indicated are at a temperature of 25° C. If not otherwise indicated, the following examples are carried out at the pressure of the surrounding atmosphere, at about 0.10 MPa, and at room temperature, at about 20° C., or at the temperature which is established on combining the reactants at room temperature without additional heating or cooling. Furthermore, all parts and percentages are, unless otherwise indicated, by weight. Production of the base compositions (silica/polyorganosiloxane mixtures) using hydrophobic pyrogenic silica Method A 255 parts by weight of a vinyldimethylsiloxy-terminated polydimethylsiloxane having a viscosity at 25° C. of 20 Pa.s are mixed at a temperature of 70° C. with 180 parts by weight of a hydrophobic pyrogenic silica having a BET specific surface area of 300 $m^2/g$ and a carbon content of 3.95% by weight, which is added in portions, for 1 hour in a double-Z kneader to give a homogeneous mass. This highly viscous composition is kneaded for 3 hours at 150° C. under an oil pump vacuum (<100 hPa). After this baking-out phase, a further 165 parts by weight of the vinyl-functional polydimethylsiloxane are mixed in and the composition is homogenized for 1 hour at room temperature. This gives a base composition containing about 30% by weight of filler.

Method B 420 parts by weight of a vinyldimethylsiloxy-terminated polydimethylsiloxane having a Brabender plasticity of 630 mkp, corresponding to a mean molecular weight of about 500,000 g/mole, are mixed at a temperature of 70° C. with 180 parts by weight of a hydrophobic pyrogenic silica having a BET surface area of 300 $m^2/g$ and a carbon content of 3.95% by weight, which is added in portions, for 1 hour in a double-Z kneader to give a homogeneous mass. This composition is kneaded and baked out for 3 hours at 150° C. under an oil pump vacuum (<100 hPa). This gives a base composition containing about 30% by weight of filler.

Method C 420 parts by weight of an SiOH-terminated polydimethylsiloxane having a Brabender plasticity of 460 mkp, corresponding to a mean molecular weight of about 350,000 g/mole, are mixed at a temperature of 70° C. with 180 parts by weight of a hydrophobic pyrogenic silica having a BET surface area of 300 $m^2/g$ and a carbon content of 3.95% by weight, which is added in portions, for 1 hour in a double-Z kneader to give a homogeneous mass. This composition is kneaded and baked out for 3 hours at 150° C. under an oil pump vacuum (<100 hPa). This gives a base composition containing about 30% by weight of filler.

Method D 288 parts by weight of a vinyldimethylsiloxy-terminated polydimethylsiloxane having a viscosity at 25° C. of 20 Pa.s are mixed at a temperature of 70° C. with 226 parts by weight of a hydrophobic pyrogenic silica having a BET specific surface area of 300 $m^2/g$ and a carbon content of 3.95% by weight, which is added in portions, for 1 hour in a double-Z kneader to give a homogenised mass. This highly viscous composition is kneaded for 3 hours at 150° C. under an oil pump vacuum (<100 hPa). After this baking-out phase, a further 132 parts by weight of the vinyl-functional polydimethylsiloxane are mixed in and the composition is homogenized for 1 hour at room temperature. This gives a base composition containing about 35% by weight of filler.

Method E 420 parts by weight of a vinyldimethylsiloxy-terminated polydimethylsiloxane having a Brabender plasticity of 630 mkp, corresponding to a mean molecular weight of about 500,000 g/mole, are mixed at a temperature of 70° C. with 226 parts by weight of a hydrophobic pyrogenic silica having a BET surface area of 300 $m^2/g$ and a carbon content of 3.95% by weight, which is added in portions, for 1 hour in a double-Z kneader to give a homogeneous mass. This composition is kneaded and baked out for 3 hours at 150° C. under an oil pump vacuum (<100 hPa). This gives a base composition containing about 35% by weight of filler.

Production of the silicone elastomers

Method R (Addition crosslinking)

200 g of the base composition produced by Method A, B, D or E are, after incorporation of the porphyrin compound as described in the following examples, mixed at a temperature of 25° C. for 10 minutes on a roll mill with 0.1 g of inhibitor, 0.2 g of hydrosilylation catalyst and 3.5 g of SiH-crosslinker to give a homogeneous mass, where the inhibitor is ethynylcyclohexanol, the hydrosilylation catalyst is a solution containing 1% by weight of platinum (based on elemental platinum) of a platinumsymdivinyltetramethyldisiloxane complex in a vinyldimethylsiloxy-terminated polydimethylsiloxane having a viscosity at 25° C. of 1000 mpa.s, obtainable from Wacker-Chemie GmbH, Munich under the name catalyst OL, and the SiH-crosslinker is a copolymer of dimethylsiloxy and methylhydrogensiloxy and trimethylsiloxy units having a viscosity at 25° C. of 320 mpa.s and a Si-bonded hydrogen content of 0.48% by weight. The crosslinkable silicone rubber composition produced in this way is crosslinked in a hydraulic press at a temperature of 170° C. for 15 minutes to give the silicone elastomer. The demoulded silicone elastomer sheets which are about 2 mm or 6 mm thick are heated for 4 hours at 200° C. in a convection drying oven.

Method S (Peroxide crosslinking)

1.4 g of dicumyl peroxide are homogeneously mixed into 200 g of the base composition produced by Methods A, B, C, D or E, after incorporation of the porphyrin compound as described in more detail in the examples, on a roll mill at a temperature of 25° C. for 10 minutes. The crosslinkable silicone rubber composition produced in this way is crosslinked in a hydraulic press at a temperature of 170° C. for 15 minutes to give the silicone elastomer. The demoulded silicone elastomer sheets which are about 2 mm or 6 mm thick are heated for 4 hours at 200° C. in a convection drying oven.

Method T (Condensation crosslinking)

200 g of the base composition produced by Method C are, after mixing in the porphyrin compound as described in more detail in the examples, mixed on a roll mill for 15 minutes at a temperature of 25° C. with 4 g of a partial hydrolysate of tetraethoxysilane having a viscosity at 25° C. of 3.5 $mm2/s$ and an $SiO_2$ content of 41% by weight, 0.4 g of a solution of zinc bis(2-ethylhexanoate) in white spirit containing 18% by weight of zinc, which is obtainable under the name "Zinkoctoat 18" from Acima, and 1 g of n-octylamine to give a homogeneous mass. The crosslinkable silicone rubber composition produced in this way is crosslinked in a hydraulic press at a temperature of 140° C. for 10 minutes to give a silicone elastomer. The demoulded silicone elastomer sheets which are about 2 mm or 6 mm

Example 1

200 g of the base composition produced by Method A are intensively mixed with a variable amount of 5,10,15,20-tetraphenyl-21H,23H-porphyrin nickel(II) complex dissolved in 50 ml of methylene chloride, by dropwise addition on a roll mill at a temperature of 25° C. over 15 minutes, with the methylene chloride being partially evaporated and the porphyrin compound being homogeneously dispersed in the silicone rubber composition. Subsequently, rolling is continued for 10 minutes at a roll temperature of 45° C. so as to remove the remaining methylene chloride. The porphyrin containing base composition of the invention is further processed by addition crosslinking in accordance with Method R or by peroxide crosslinking in accordance with Method S to give silicone elastomers.

Example 2

The porphyrin-containing base composition is produced as in Example 1, but the porphyrin compound used is the 5,10,15,20-tetraphenyl-21H,23H-porphyrin copper(II) complex.

Example 3

The porphyrin-containing base composition is produced as in Example 1, but the porphyrin compound used is the 5,10,15,20-tetraphenyl-21H,23H-porphyrin cobalt(II) complex.

Example 4

The porphyrin-containing base composition is produced as in Example 1, but the porphyrin compound used is the 5,10,15,20-tetraphenyl-21H,23H-porphyrin zinc(II) complex.

Example 5

The porphyrin-containing base composition is produced as in Example 1, but the porphyrin compound used is the 5,10,15,20-tetraphenyl-21H,23H-porphyrin iron(III) chloride complex.

Example 6

The porphyrin-containing base composition is produced as in Example 1, but the porphyrin compound used is the 5,10,15,20-tetraphenyl-21H,23H-porphyrin manganese(III) chloride complex.

Example 7
(not according to the invention)

For comparison, a porphyrin-free base composition is produced according to the procedure given in Example 1 and is further processed by addition crosslinking in accordance with Method R or peroxide crosslinking in accordance with Method S to give silicone elastomers.

Example 8
(not according to the invention):

200 g of an (addition-crosslinking) liquid polydimethylsiloxane rubber composition consisting of equal parts of A and B components, which is obtainable under the name Elastosil$^R$ LR 3003/40 from Wacker-Chemie GmbH, Munich, are mixed on a roll mill at a temperature of 25° C. for 10 minutes to give a homogeneous mass. The crosslinkable silicone rubber composition produced in this way is subsequently crosslinked in a hydraulic press at a temperature of 170° C. for 15 minutes to give the silicone elastomer. The demoulded silicone elastomer sheets which are about 2 mm or 6 mm thick are heated for 4 hours at 200° C. in a convection drying oven.

Example 9

100 g of the A component of an (addition-crosslinking) liquid polydimethylsiloxane rubber composition, which is obtainable under the name Elastosil$^R$ LR 3003/40 from Wacker-Chemie GmbH, Munich, are intensively mixed on a roll mill with 100 mg of 5,10,15,20-tetraphenyl-21H,23H-porphyrin (TPP), which has been completely dissolved in 50 ml of methylene chloride, by dropwise addition at a temperature of 25° C. over 15 minutes, with the methylene chloride being partially evaporated and the porphyrin compound being homogeneously dispersed in the silicone rubber composition. Subsequently, the remaining methylene chloride is removed at a roll temperature of 45° C. over 10 minutes. The porphyrin-containing A component is then homogenized on the roll mill with 100 g of the B component of said liquid silicone rubber composition and subsequently, as described in Example 8, crosslinked to give a silicone elastomer. The silicone elastomer has a TPP content of 500 ppm by weight.

Example 10
(not according to the invention)

Corresponds to Example 8, except that the liquid polydimethylsiloxane rubber composition Elastosil® LR 3003/40 is replaced by the grade LR3003/50.

Example 11

100 g of the A component of an (addition-crosslinking) liquid polydimethylsiloxane rubber composition, which is obtainable under the name Elastosil$^R$ LR 3003/50 from Wacker-Chemie GmbH, Munich, are intensively mixed on a roll mill with 50, 150 or 300 mg of 5,10,15,20-tetraphenyl-21H, 23H-porphyrin (TPP), which has been completely dissolved in 50 ml of methylene chloride, by dropwise addition at a temperature of 25° C. over 15 minutes, with the methylene chloride being partially evaporated and the porphyrin compound being homogeneously dispersed in the silicone rubber composition. Subsequently, the remaining methylene chloride is removed at a roll temperature of 45° C. over 10 minutes. The TTP-containing A component is then homogenized on the roll mill with 100 g of the B component of said liquid silicone rubber composition and subsequently, as described in Example 8, crosslinked to give a silicone elastomer. The silicone elastomer has a TPP content of 250, 750 or 1500 ppm by weight.

Example 12
(not according to the invention)

200 g of an (addition-crosslinking) liquid polydimethylsiloxane rubber composition consisting of equal parts of A and B components, which is obtainable under the name Elastosil$^R$ LR 3003/30 from Wacker-Chemie GmbH, Munich, are mixed on a roll mill at a temperature of 25° C. for 10 minutes to give a homogeneous mass. The crosslinkable silicone rubber composition produced in this way is subsequently crosslinked in a hydraulic press at a temperature of 170° C. for 15 minutes to give the silicone elastomer. The demoulded silicone elastomer sheets which are about 2 mm or 6 nm thick are heated for 4 hours at 200° C. in a convection drying oven.

Example 13

100 g of the A component of an (addition-crosslinking) liquid polydimethylsiloxane rubber composition, which is obtainable under the name Elastosil$^R$ LR 3003/30 from Wacker-Chemie GmbH, Munich, are intensively mixed on a roll mill with 100 mg of 5,10,15,20-tetra(4-pyridyl)-21H, 23H-porphyrin, which has been completely dissolved in 50 ml of methylene chloride, by dropwise addition at a temperature of 25° C. over 15 minutes, with the methylene chloride being partially evaporated and the porphyrin compound being homogeneously dispersed in the silicone rubber composition. Subsequently, the remaining methylene chloride is removed at a roll temperature of 45° C. over 10 minutes. The A component obtained in this way is then homogenized on the roll mill with 100 g of the B component of said liquid silicone rubber composition and subsequently, as described in Example 12, crosslinked to give a silicone elastomer. The silicone elastomer contains 500 ppm by weight of porphyrin compound.
Mechanical properties of the silicone elastomers before and after heat stressing The thermal stability of the silicone elastomers produced, both according to the invention and not according to the invention, is evaluated by means of the following criteria:

Mechanical elastomer properties such as Shore A hardness (in accordance with DIN 53 505), tensile strength (in accordance with DIN 53 504), elongation at break (in accordance with DIN 53 504), tear propagation resistance (in accordance with ASTM D624), rebound resilience (DIN 53 512) and the tensile stresses in the tensile test at 100 or 300% elongation, before and after thermal stressing of the silicone elastomers by storing them uncovered for different times at 250° C. in a convection drying oven.

The following abbreviations are used in the tables:

TS=Tensile strength
EB=Elongation at break
St.100=Tensile stress at 100% elongation
St.300=Tensile stress at 300% elongation
TPR=Tear propagation resistance
RR=Rebound resilience
d=Day

TABLE 1

Mechanical elastomer properties before and after thermal stressing

| Example | Method for base composition | Method of cross-linking | Porphyrin content ppm by wt | Heat storage d/250° C. | Shore A | TS N/mm$^2$ | EB % | St. 100 N/mm$^2$ | St. 300 N/mm$^2$ | TPR N/mm | RR % |
|---|---|---|---|---|---|---|---|---|---|---|---|
| 7 | A | S | 0 | 0 | 41 | 10.6 | 600 | 0.6 | 2.8 | 20.4 | 41 |
| 1 | A | S | 0 | 1 | 55 | 3.8 | 90 | — | — | 3.6 | 44 |
| 1 | A | S | 500 | 4 | 56 | 5.1 | 190 | 2.6 | — | — | 59 |
| 1 | A | S | 500 | 6 | 62 | 2.7 | 80 | — | — | 6.6 | 61 |
| 1 | A | S | 1000 | 6 | 58 | 5.5 | 170 | 2.9 | — | 8.0 | 61 |
| 2 | A | S | 500 | 4 | 57 | 4.9 | 190 | 2.2 | — | 11.3 | 60 |
| 2 | A | S | 500 | 6 | 60 | 4.7 | 160 | 2.5 | — | 11.2 | 60 |
| 2 | A | S | 1000 | 6 | 61 | 4.5 | 150 | 2.7 | — | 10.9 | 62 |
| 3 | A | S | 500 | 4 | 42 | 2.8 | 210 | 1.5 | — | 10.9 | 41 |
| 3 | A | S | 500 | 6 | 46 | 4.3 | 230 | 1.7 | — | 12.1 | 44 |
| 3 | A | S | 1000 | 6 | 41 | 2.8 | 220 | 1.4 | — | 10.1 | 38 |
| 4 | A | S | 500 | 4 | 50 | 5.8 | 250 | 1.9 | — | 12.4 | 52 |
| 4 | A | S | 500 | 6 | 53 | 6.1 | 220 | 2.3 | — | 9.9 | 55 |
| 4 | A | S | 1000 | 6 | 52 | 7.1 | 280 | 2.0 | — | 13.0 | 54 |
| 5 | A | S | 500 | 4 | 47 | 5.7 | 310 | 1.5 | 5.4 | 15.5 | 47 |
| 5 | A | S | 500 | 6 | 49 | 5.1 | 270 | 1.6 | — | 15.5 | 49 |
| 5 | A | S | 1000 | 6 | 48 | 4.2 | 220 | 1.7 | — | 16.5 | 47 |
| 6 | A | S | 500 | 4 | 47 | 5.4 | 280 | 1.5 | — | 16.8 | 49 |
| 6 | A | S | 500 | 6 | 49 | 5.2 | 250 | 1.7 | — | 16.5 | 52 |
| 6 | A | S | 1000 | 6 | 48 | 5.8 | 280 | 1.7 | — | 15.7 | 51 |

TABLE 2

Mechanical elastomer properties before and after thermal stressing

| Example | Method for base composition | Method of cross-linking | Porphyrin content ppm by wt | Heat storage d/250° C. | Shore A | TS N/mm$^2$ | EB % | St. 100 N/mm$^2$ | St. 300 N/mm$^2$ | TPR N/mm | RR % |
|---|---|---|---|---|---|---|---|---|---|---|---|
| 7 | A | R | 0 | 0 | 48 | 6.4 | 490 | 1.2 | 4.4 | 32.6 | 57 |
| 7 | A | R | 0 | 1 | 58 | 2.8 | 80 | — | — | 2.7 | 59 |
| 1 | A | R | 500 | 2 | 50 | 3.6 | 160 | 2.1 | — | 10.9 | 59 |
| 2 | A | R | 500 | 2 | 47 | 6.0 | 260 | 1.6 | — | 20.2 | 51 |
| 3 | A | R | 500 | 2 | 45 | 6.5 | 330 | 1.4 | 5.8 | 24.7 | 54 |
| 4 | A | R | 500 | 2 | 48 | 8.0 | 360 | 1.5 | 6.2 | 21.4 | 54 |
| 5 | A | R | 500 | 2 | 44 | 6.7 | 340 | 1.4 | 5.7 | 22.9 | 51 |
| 6 | A | R | 500 | 2 | 46 | 6.5 | 410 | 1.3 | 5.5 | 26.9 | 57 |

TABLE 3

Mechanical elastomer properties before and after thermal stressing

| Example | TPP content ppm by wt | Heat storage d/250° C. | Shore A | TS N/mm² | EB % | St. 100 N/mm² | St. 300 N/mm² | TPR N/mm | RR % |
|---|---|---|---|---|---|---|---|---|---|
| 8 | 0 | 0 | 42 | 9.6 | 670 | 0.9 | 3.1 | 32.6 | 49 |
| 8 | 0 | 1 | 46 | 6.2 | 250 | 1.7 | — | 19.0 | 44 |
| 8 | 0 | 2 | 62 | 3.3 | 80 | — | — | 5.6 | 61 |
| 9 | 500 | 0 | 44 | 7.6 | 620 | 0.8 | 2.5 | 29.3 | 53 |
| 9 | 500 | 2 | 14 | 5.9 | 420 | 1.0 | 3.9 | 31.2 | 47 |
| 9 | 500 | 5 | 41 | 5.6 | 380 | 1.2 | 4.4 | 26.6 | 41 |
| 9 | 500 | 7 | 43 | 5.3 | 320 | 1.4 | 4.9 | 24.0 | 41 |
| 9 | 500 | 10 | 44 | 5.8 | 320 | 1.5 | 5.4 | 22.2 | 41 |
| 10 | 0 | 0 | 52 | 8.5 | 400 | 1.9 | 6.7 | 30.2 | 64 |
| 10 | 0 | 1 | 56 | 4.8 | 169 | 2.8 | — | 8.8 | 55 |
| 10 | 0 | 2 | 77 | — | — | — | — | — | — |
| 11 | 250 | 0 | 52 | 8.9 | 510 | 1.4 | 4.8 | 30.0 | 65 |
| 11 | 250 | 2 | 44 | 7.9 | 510 | 1.1 | 4.5 | 30.5 | 18 |
| 11 | 250 | 5 | 46 | 5.9 | 340 | 1.3 | 5.2 | 28.5 | 51 |
| 11 | 250 | 8 | 55 | 5.1 | 360 | 1.6 | 5.0 | 18.6 | 46 |
| 11 | 250 | 10 | 67 | 3.1 | 30 | — | — | 2.9 | 62 |
| 11 | 750 | 0 | 52 | 8.7 | 510 | 1.4 | 4.7 | 32.7 | 65 |
| 11 | 750 | 2 | 14 | 8.3 | 440 | 1.2 | 4.0 | 33.1 | 49 |
| 11 | 750 | 5 | 45 | 5.9 | 380 | 1.2 | 4.7 | 25.1 | 49 |
| 11 | 750 | 8 | 45 | 6.1 | 350 | 1.4 | 5.3 | 21.6 | 48 |
| 11 | 750 | 10 | 41 | 6.6 | 340 | 1.6 | 6.0 | 17.9 | 44 |
| 11 | 1500 | 0 | 52 | 8.1 | 480 | 1.4 | 4.7 | 31.4 | 66 |
| 11 | 1500 | 2 | 45 | 8.4 | 490 | 1.2 | 4.7 | 30.9 | 46 |
| 11 | 1500 | 5 | 44 | 5.4 | 350 | 1.2 | 4.6 | 23.7 | 46 |
| 11 | 1500 | 8 | 45 | 5.9 | 330 | 1.5 | 5.3 | 21.9 | 46 |
| 11 | 1500 | 10 | 46 | 6.2 | 320 | 1.6 | 5.7 | 17.5 | 44 |

TABLE 4

Mechanical elastomer properties before and after thermal stressing

| Example | Porphyrin content ppm by wt | Heat storage d/250° C. | Shore A | TS N/mm² | EB % | St. 100 N/mm² | St. 300 N/mm² | TPR N/mm | RR % |
|---|---|---|---|---|---|---|---|---|---|
| 12 | 0 | 0 | 31 | 8.9 | 670 | 0.5 | 2.0 | 26.1 | 49 |
| 12 | 0 | 1 | 42 | 4.5 | 230 | 1.2 | — | 18.1 | 44 |
| 12 | 0 | 2 | 59 | 2.9 | 90 | — | — | 8.3 | 52 |
| 13 | 500 | 0 | 30 | 8.9 | 690 | 0.4 | 1.9 | 25.3 | 50 |
| 13 | 500 | 1 | 30 | 9.1 | 630 | 0.6 | 2.9 | 25.4 | 48 |
| 13 | 500 | 2 | 31 | 7.4 | 530 | 0.6 | 3.2 | 27.6 | 48 |
| 13 | 500 | 4 | 30 | 6.0 | 430 | 0.7 | 3.6 | 23.6 | 48 |
| 13 | 500 | 5 | 31 | 5.5 | 390 | 0.7 | 3.8 | 23.3 | 47 |

What is claimed is:

1. A method of increasing thermal stability of a silicone composition subject to thermal or thermal oxidative stress, consisting essentially of adding a porphyrin or mixture of porphyrins of the general formulae where

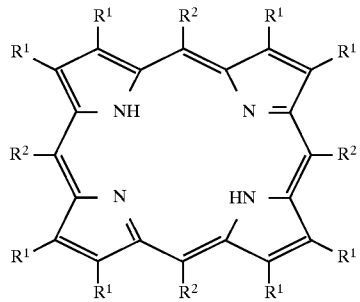

(1)

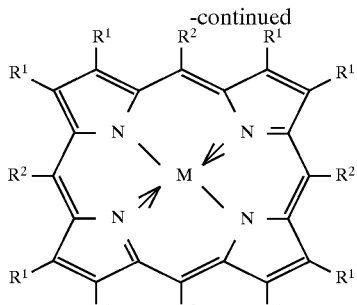

(2)

$R_2$ is an identical or different radical selected from the group consisting of —H, —OH, —OR³, —COR³, —OCOR³, —NO₂, —CN, —F, —Cl, —Br, —I, —SCN, —OCN, —N=N—OH, —NR³₂ and —SO₃A and a monovalent hydrocarbon radical having from 1 to 20 carbon atoms which is optionally substituted by —H, —OH, Or³, —COR³, —COOR³, OCOR³, —NO₂, —CN, —F, —Cl. —Br, —I, —SCN, —OCN, —N=N—OH, —NR$^3_2$, —N$^3_3$B or SO$_3$A, where, in the optionally substituted monovalent hydrocarbon radical, non-adjacent —CH= units are optionally replaced with —N= units and —CH$_2$— units are optionally replaced with —O—, —S— or —NH— units, R$^3$ is selected from the group consisting of —H and a monovalent hydrocarbon radical having from 1 to 20 carbon atoms, A is selected from the group consisting of —H, Na, and K, B is selected from the group consisting of Cl, F, Br and I, R$^1$ is an identical or different R$^2$ radical or two vicinal radicals R$^1$ where together with the carbon atoms of the porphyrin ring to which they are bound from a cyclic hydrocarbon radical having from 5 to 10 carbon atoms in which non-adjacent —CH= units are optionally replaced with —N= units and —CH$_2$— units are optionally replaced with —O—, —S— or —NH— units, where, in the cyclic hydrocarbon radical, —CH= and —CH$_2$— units are optionally substituted with —H, —OH, OR$^3$, —COR$^3$, —COOR$^3$, OCOR$^3$, —NO$_2$, —CN, —F, —Cl, —Br, —I, —SCN, —OCN, —N=N—OH, —NR$^3_2$, —NR$^3_3$B or SO$_3$A, M is a metal selected from the group consisting of Li, Na, K, Rb and Cs, Be, Mg, Sr, Ba, V, Cr, Mn, Fe, Co, Ni, Cu, Zn, Zr, Ru, Hf, Os, Cd, Hg, Ag, Au, Pd, Pt, Si, Ge, Sn, In and Ce, where, if the oxidation state of M is higher than two, the free valences are satisfied by radicals R$^2$ or radicals of organosilicon compounds;

to a silicone composition of the general formula $$R^4_a SiO_{(4-a)/2} \tag{3}$$

and the following optional components i. a polyorganosiloxane of the formula $$—OSi(R^4_2)R^5Si(R^4_2)O— \tag{4}$$

linked to the silicone composition (3), and ii. a crosslinking additive, where

R$^4$ is an identical or different, monovalent hydrocarbon radical having from 1 to 18 carbon atoms which are optionally fluoro-, chloro-, bromo-, or cyano-substituted, R$^5$ is an identical or different, divalent hydrocarbon radical having from 1 to 18 carbon atoms which are optionally fluoro-, chloro-, bromo-, or cyano-substituted, or a polyoxy-C$_1$–C$_4$ alkylene radical, and a is 0, 1, 2 or 3.

2. A method as claimed in claim 1, wherein the silicone composition is a silicone oil.

3. A method as claimed in claim 1, wherein the silicone composition is a crosslinkable silicone rubber composition.

4. A method as claimed in claim 1, wherein the porphyrin is fixed on a finely divided support.

5. A method as claimed in claim 1, wherein the prophyrin is first dissolved in a solvent and then added to the silicone composition.

6. A method as claimed in claim 1, wherein the porphyrin is added directly in finely divided form to the silicone composition.

7. A method as claimed in claim 1, wherein the prophyrin is present in an amount of from 250 ppm to 1500 ppm based on the weight of the silicone composition.

* * * * *